US012759300B2

(12) United States Patent
Inui et al.

(10) Patent No.: US 12,759,300 B2
(45) Date of Patent: Oct. 13, 2026

(54) INKJET RECORDING APPARATUS

(71) Applicant: KYOCERA Document Solutions Inc., Osaka (JP)

(72) Inventors: Yasutaka Inui, Osaka (JP); Yuko Yano, Osaka (JP); Shuhei Kawamata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 131 days.

(21) Appl. No.: 18/970,412

(22) Filed: Dec. 5, 2024

(65) Prior Publication Data

US 2025/0187342 A1 Jun. 12, 2025

(30) Foreign Application Priority Data

Dec. 11, 2023 (JP) ................................ 2023-208429

(51) Int. Cl.
*B41J 2/17* (2006.01)
*B41J 2/165* (2006.01)

(52) U.S. Cl.
CPC ......... *B41J 2/1714* (2013.01); *B41J 2/16552* (2013.01); *B41J 2002/16558* (2013.01)

(58) Field of Classification Search
CPC .................. B41J 2/1714; B41J 2/16552; B41J 2002/16558; B41J 2002/16591; B41J 2/16588; B41J 2/16538; B41J 2/16547; B41J 2/16508; B41J 2/16523
See application file for complete search history.

(56) References Cited

U.S. PATENT DOCUMENTS

2019/0389204 A1 12/2019 Murashima et al. ........................ B41J 2/04561
2020/0016899 A1* 1/2020 Ogasahara ........... B41J 2/16508
2020/0156379 A1 5/2020 Onishi ................. B41J 2/16535

FOREIGN PATENT DOCUMENTS

JP 2002127462 A * 5/2002
JP 2019-217691 A 12/2019
JP 2020-082358 A 6/2020

OTHER PUBLICATIONS

English Translation for JP 2002127462 A (Year: 2002).*

* cited by examiner

*Primary Examiner* — Ricardo I Magallanes
*Assistant Examiner* — Tracey M McMillion
(74) *Attorney, Agent, or Firm* — Stein IP, LLC

(57) ABSTRACT

An inkjet recording apparatus includes an ink collection tray and a cleaning liquid feeding mechanism. The ink collection tray is disposed opposite the recording head to collect ink pushed out onto the ink ejection surface of the recording head. The cleaning liquid feeding mechanism feeds a cleaning liquid onto the ink collection tray. The ink collection tray has a cleaning liquid catching portion, a cleaning liquid spreading portion, a waste ink catching portion, and a waste ink discharge portion, and has a downward slope from the cleaning liquid catching portion toward the waste ink discharge portion. The waste ink catching portion has formed in it a plurality of grooves with a V-shaped cross section extending along the downward slope. The cleaning liquid spreading portion has formed on it a pair of ribs that spreads in a fan shape from the cleaning liquid catching portion toward the waste ink catching portion.

8 Claims, 7 Drawing Sheets

INKJET RECORDING APPARATUS

INCORPORATION BY REFERENCE

This application is based on and claims the benefit of priority from Japanese Patent Application No. 2023-208429 filed on Dec. 11, 2023, the contents of which are hereby incorporated by reference.

BACKGROUND

The present disclosure relates to an inkjet recording apparatus that performs recording by ejecting ink onto a recording medium, and relates particularly to an inkjet recording apparatus provided with an ink collection tray that catches ink pushed out through an ink ejection surface of a recording head.

As recording apparatuses such as facsimile machines, copiers, and printers, inkjet recording apparatuses, which form images by ejecting ink onto a recording medium such as paper and OHP sheet, are widely used for their capability of forming high-definition images.

Generally, on such an inkjet recording apparatus, for the purpose of preventing drying of and clogging with ink inside ink ejection nozzles that have openings in an ink ejection surface of a recording head, ink is forcibly pushed out of the nozzles (purging). This pushing-out of ink permits removal, from inside the nozzles, of ink with increased viscosity, air bubbles, foreign matter, and the like. The ink so pushed out dissolves back the mist (ink residue) deposited on the ink ejection surface. After ink is pushed out, the ink deposited on the ink ejection surface (nozzle surface) is wiped off with a blade-form wiper to accomplish recovery operation for the recording head.

The ink wiped off with the wiper drops onto an ink collection tray for catching the ink so as to be collected there and discharged out of it as waste liquid. The ink that has fallen onto the ink collection tray dries and loses fluidity. Ink with reduced fluidity accumulates on the ink collection tray and deposits on a conveyance belt, eventually soiling the recording medium. On the other hand, solidified ink clogs an ink discharge flow passage and causes soiling in and failure of the apparatus.

SUMMARY

According to one aspect of the present disclosure, an inkjet recording apparatus includes an ink collection tray and a cleaning liquid feeding mechanism. When recovery operation is performed for a recording head that ejects ink onto a recording medium, the ink collection tray is disposed opposite the recording head to collect the ink pushed out onto an ink ejection surface of the recording head. The cleaning liquid feeding mechanism feeds onto the ink collection tray a cleaning liquid for flushing off the ink. The ink collection tray includes: a cleaning liquid catching portion that catches the cleaning liquid dropped from the cleaning liquid feeding mechanism; a waste ink catching portion disposed opposite the ink ejection surface; a cleaning liquid spreading portion disposed between the cleaning liquid catching portion and the waste ink catching portion; and a waste ink discharge portion disposed adjacent to the waste ink catching portion opposite from the cleaning liquid spreading portion. The ink collection tray has a downward slope from the cleaning liquid catching portion toward the waste ink discharge portion. The waste ink catching portion has formed in it a plurality of grooves with a V-shaped cross section extending along the downward slope. The cleaning liquid spreading portion has formed on it a pair of ribs spreading in a fan shape from the cleaning liquid catching portion toward the waste ink catching portion.

DETAILED DESCRIPTION

Figure 1:
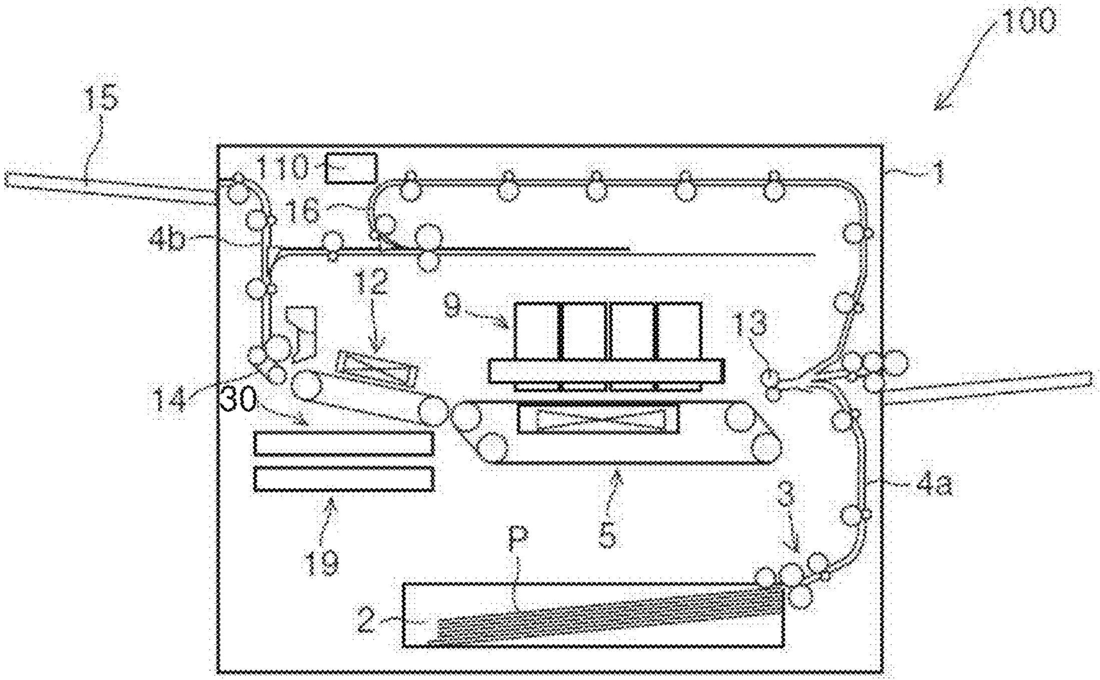
FIG. 1 is a side sectional view showing an outline configuration of an inkjet printer according to one embodiment of the present disclosure.

1. Construction of an Inkjet Recording Apparatus: An embodiment of the present disclosure will be described below with reference to the accompanying drawings. FIG. 1 is a side sectional view showing an outline configuration of a printer 100 as an inkjet recording apparatus according to one embodiment of the present disclosure. The printer 100 includes a sheet feed cassette 2 as a sheet storage portion. The sheet feed cassette 2 is disposed in a lower part inside a printer body 1. The sheet feed cassette 2 stores inside it sheets of paper P as one example of a recording medium.

Downstream of the sheet feed cassette 2 along the sheet conveyance direction, that is, at the upper right side of the sheet feed cassette 2 in FIG. 1, a sheet feeding device 3 is disposed. The sheet feeding device 3 feeds out the sheets P, separately one by one, to the upper right of the sheet feed cassette 2 in FIG. 1.

The printer 100 has a first sheet conveyance passage 4*a* in it. The first sheet conveyance passage 4*a* is located at the upper right of the sheet feed cassette 2, that is, in the direction in which it feeds sheets. A sheet P fed out of the sheet feed cassette 2 is conveyed by the first sheet conveyance passage 4*a* vertically upward along a side face of the printer body 1.

At the downstream end of the first sheet conveyance passage 4*a* along the sheet conveyance direction, a pair of registration rollers 13 is provided. Closely downstream of the pair of registration rollers 13 along the sheet conveyance direction, a first conveyance unit 5 and a recording portion 9 are disposed. The sheet P fed out of the sheet feed cassette 2 passes through the first sheet conveyance passage 4*a* and reaches the pair of registration rollers 13. The pair of registration rollers 13 feeds out the sheet P toward the first conveyance unit 5 (in particular, a first conveyance belt 8, which will be described later), while correcting a skew of the sheet P and coordinating timing with ink ejection operation in the recording portion 9.

The sheet P fed out to the first conveyance unit 5 by the pair of registration rollers 13 is conveyed by the first conveyance belt 8 to a position opposite the recording portion 9 (in particular, recording heads 17*a* to 17*c*, which will be described later). The recording portion 9 ejects ink onto the sheet P and thereby records an image on the sheet P. At this time, the ejection of ink by the recording portion 9 is controlled by a control device 110 within the printer 100.

Downstream of (in FIG. 1, at the left of) the first conveyance unit 5 along the sheet conveyance direction, a second conveyance unit 12 is disposed. The sheet P having the image recorded on it by the recording portion 9 is fed to the second conveyance unit 12. The ink ejected onto the surface of the sheet P dries while passing through the second conveyance unit 12.

Downstream of the second conveyance unit 12 along the sheet conveyance direction, near the left side face of the printer body 1, a decurler 14 is provided. The sheet P having ink dried in the second conveyance unit 12 is fed to the decurler 14, which corrects a curl that has developed in the sheet P.

Downstream of (in FIG. 1, above) the decurler 14 along the sheet conveyance direction, a second sheet conveyance passage 4*b* is provided. When duplex printing is not performed, the sheet P having passed through the decurler 14 passes through the second sheet conveyance passage 4*b* and is discharged to a sheet discharge tray 15*a* provided on the left side face of the printer 100, outside it. Below the sheet discharge tray 15*a*, a sub discharge tray 15*b* is provided to which are discharged unnecessary sheets P (waste sheets) with print defects and the like.

In an upper part of the printer body 1, above the recording portion 9 and the second conveyance unit 12, a reversing conveyance passage 16 for duplex printing is provided. When duplex printing is performed, the sheet P that has undergone recording on one side (first side) and that has passed through the second conveyance unit 12 and the decurler 14 is fed through the second sheet conveyance passage 4*b* to the reversing conveyance passage 16.

The sheet P fed to the reversing conveyance passage 16 then has its conveyance direction switched for recording on the other side (second side). The sheet P then passes through an upper part of the printer body 1 to be fed rightward, and is then fed via the pair of registration rollers 13 to the first conveyance unit 5 again, this time with the second face up. In the first conveyance unit 5, the sheet P is conveyed to a position opposite the recording portion 9, where the recording portion 9 ejects ink to record an image on the second side. The sheet P having undergone recording on both sides passes through the second conveyance unit 12, the decurler 14, and the second sheet conveyance passage 4*b* in this order and is discharged to the sheet discharge tray 15*a*.

Below the second conveyance unit 12, a maintenance unit 19 and a cap unit 30 are disposed. When the printer 100 performs purging, the maintenance unit 19 moves horizontally to under the recording portion 9; there it wipes off the ink pushed out through ink ejection ports 18 in the recording heads 17*a* to 17*c* (for those, see FIG. 2) and collects the ink so wiped off. Purging denotes operation of forcibly pushing ink out through the ink ejection ports 18 in the recording heads 17*a* to 17*c* to remove ink with increased viscosity, foreign matter, and air bubbles inside the ink ejection ports 18. When the cap unit 30 caps the ink ejection surface of the recording heads 17*a* to 17*c*, it moves horizontally to under the recording portion 9 and then moves upward to be attached to the bottom surface of the recording heads 17*a* to 17*c*.

Figure 2:
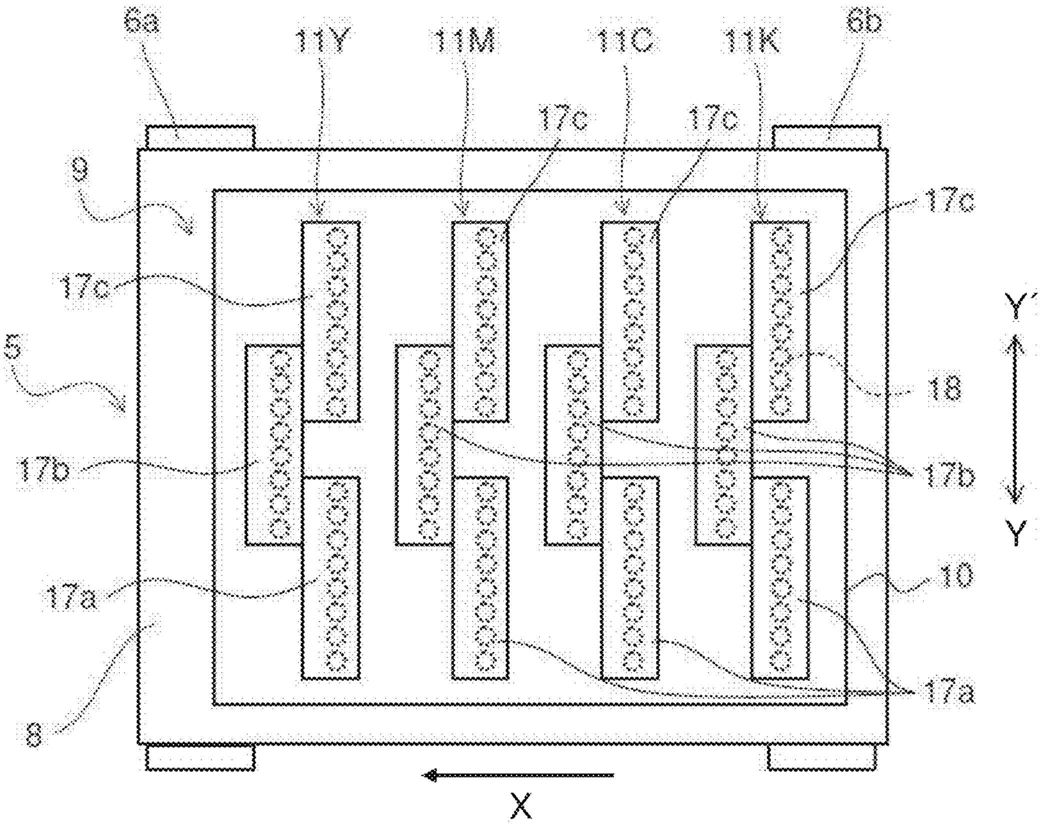
FIG. 2 is a plan view of a recording portion provided in the printer.
Figure 3:
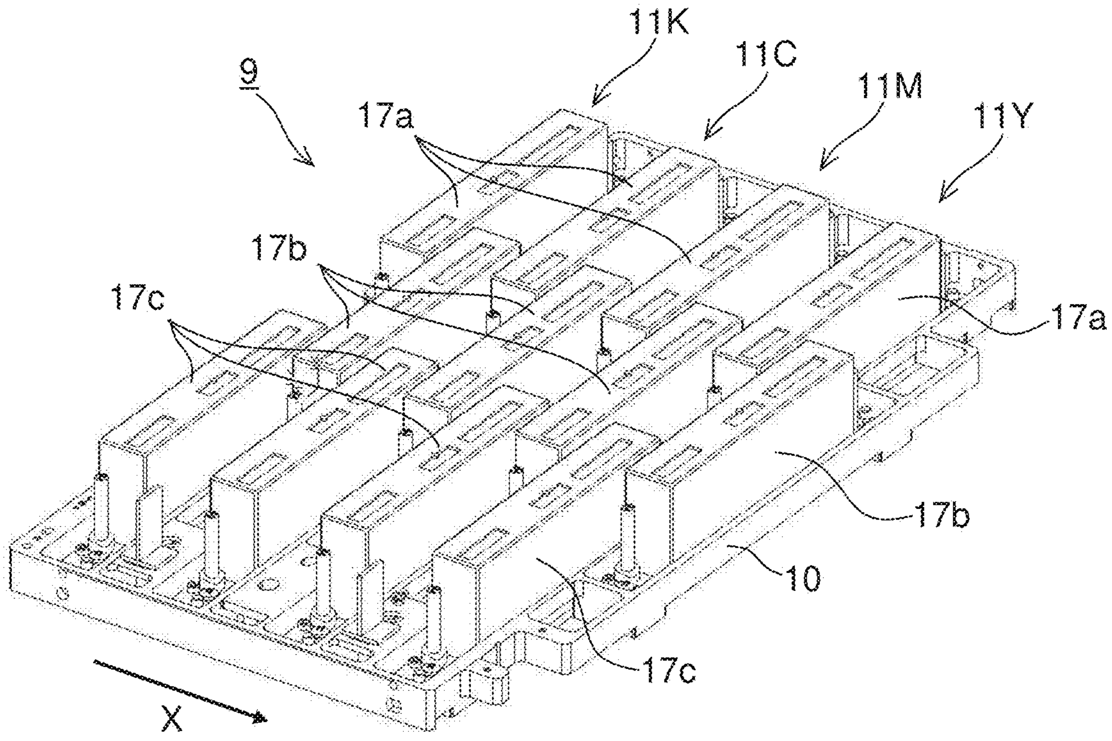
FIG. 3 is a perspective view of the recording portion as seen from above.

FIG. 2 is a plan view of the recording portion 9. FIG. 3 is a perspective view of the recording portion 9 as seen from above. As shown in FIGS. 2 and 3, the recording portion 9 includes a head housing 10 and line heads 11Y, 11M, 11C, and 11K. The line heads 11Y to 11K are held on the head housing 10 at such a height as to form a predetermined interval (e.g., 1 mm) relative to the conveyance surface of a first conveyance belt 8, which is an endless belt stretched around a plurality of rollers including a driving roller 6*a* and a driven roller 6*b*. The driving roller 6*a* makes the first conveyance belt 8 travel in the conveyance direction (arrow-X direction) of the sheet P.

The line heads 11Y to 11K each include a plurality of (here, three) recording heads 17*a* to 17*c*. The recording heads 17*a* to 17*c* are disposed in a staggered row along an intersecting direction, which is a direction intersecting the sheet conveyance direction (arrow-X direction). In the embodiment, the intersecting direction coincides with the sheet width direction (arrow-YY' direction), which is orthogonal to the sheet conveyance direction (arrow-X direction). The recording heads 17*a* to 17*c* have a plurality of ink ejection ports 18 (nozzles). The ink ejection ports 18 are disposed in a row at equal intervals along the intersecting direction (arrow-YY' direction). From the line heads 11Y to 11K, through the ink ejection ports 18 in the recording heads 17*a* to 17*c*, inks (in the embodiment, water-based inks) of different colors, specifically yellow (Y), magenta (M), cyan (C), and black (K), are ejected toward the sheet P being conveyed on the first conveyance belt 8.

Figure 4:
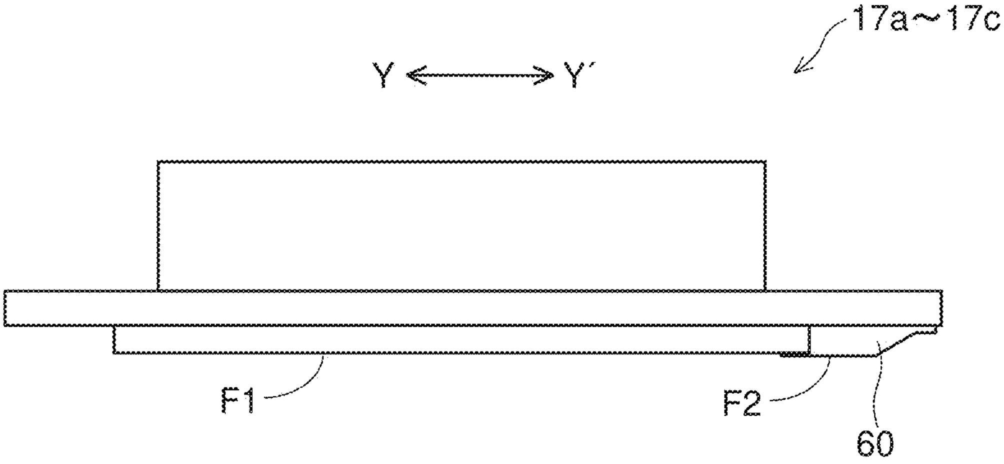
FIG. 4 is a side view of a recording head in a line head in the recording portion.
Figure 5:
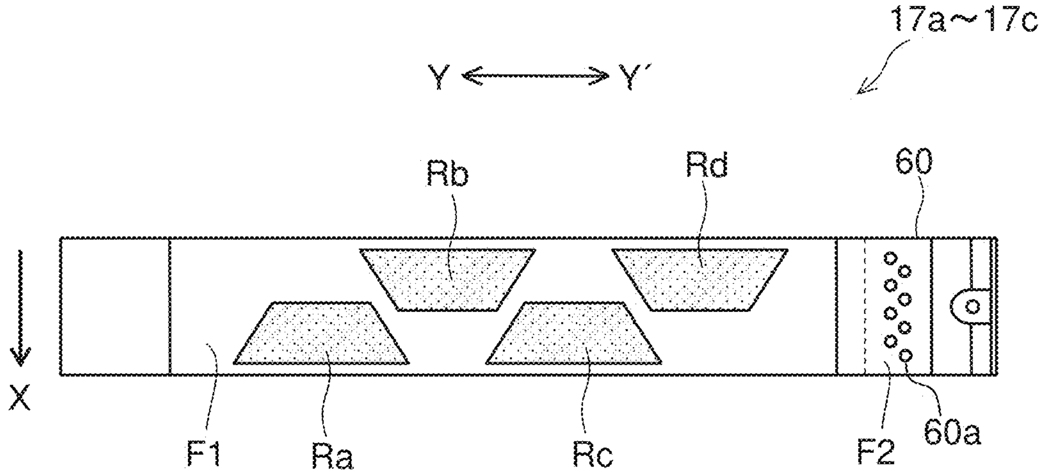
FIG. 5 is a plan view of the recording head as seen from an ink ejection surface side.

FIG. 4 is a side view of the recording head 17*a* to 17*c* in the line heads 11Y to 11K in the recording portion 9, and FIG. 5 is a plan view of the recording head 17*a* to 17*c* as seen from the ink ejection surface F1 side. The recording heads 17*a* to 17*c* are shaped and configured identically and so in FIGS. 4 and 5 one of the recording heads 17*a* to 17*c* is illustrated as their representative.

As shown in FIG. 5, on the ink ejection surface (nozzle surface) F1 of the recording head 17*a* to 17*c*, a plurality (here, four blocks) of nozzle regions Ra to Rd are provided, in which a large number of ink ejection ports 18 (see FIG. 2) are arrayed. The ink ejection surface F1 is formed of, for example, SUS (stainless steel). On the ink ejection surface F1, a water-repellent film (not shown) is formed.

The recording heads 17*a* to 17*c* in the line heads 11Y to 11K are supplied with inks of four colors (yellow, magenta, cyan, and black) stored in ink tanks (not shown) respectively according to the colors for which the line heads 11Y to 11K are intended.

In response to a control signal from the control device 110 (see FIG. 1), the recording heads 17*a* to 17*c* eject from the ink ejection ports 18 inks toward a sheet P being conveyed on, by being held by suction on, the conveyance surface of the first conveyance belt 8 according to image data received from an external computer. As a result, on the sheet P on the first conveyance belt 8, a color image having inks of four colors, namely yellow, magenta, cyan, and black, laid over each other is formed. In one end part of the recording head 17*a* to 17*c* along its longitudinal direction (arrow-YY' direction), which is orthogonal to the sheet conveyance direction (arrow-X direction), a cleaning liquid feed portion 60 that feeds a cleaning liquid is provided. In the cleaning liquid feed portion 60, a large number of cleaning liquid feeding ports 60*a* are formed.

On the printer 100, to clean the ink ejection surface F1 of the recording heads 17*a* to 17*c*, when printing is started after a long period of non-operation or between sessions of printing, recovery operation for the recording heads 17*a* to 17*c* is performed in the following manner: ink is pushed out through the ink ejection ports 18 in all the recording heads 17*a* to 17*c* (purging) and the cleaning liquid is supplied from the cleaning liquid feeding ports 60*a* to a cleaning liquid supply surface F2; then the ink pushed out on the ink ejection surface F1 is together with the cleaning liquid wiped off with a wiper 35 (see FIG. 8) in preparation for subsequent printing. The ink and the cleaning liquid wiped off the ink ejection surface F1 is collected in an ink collection tray 50 (see FIG. 9), which will be described later.

Figure 6:
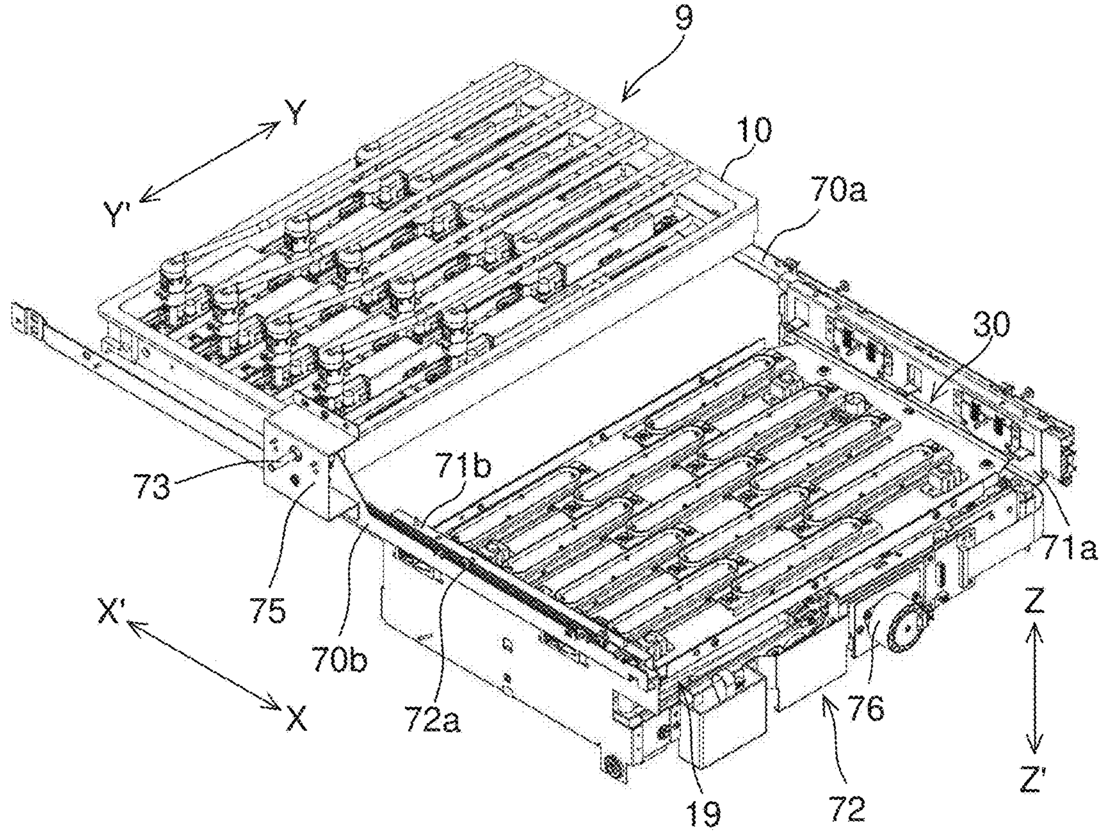
FIG. 6 is a perspective view of the recording portion, a cap unit, and a maintenance unit in the printer.

2. Construction of the Maintenance Unit: FIG. 6 is a perspective view of the recording portion 9, the cap unit 30, and the maintenance unit 19 in the printer 100. As shown in FIG. 6, below the recording portion 9, along its opposite end parts parallel to the sheet conveyance direction (arrow-X direction), two guide rails 70*a* and 70*b* are fixed. To the guide rails 70*a* and 70*b*, a pair of guide plates 71*a* and 71*b* are fixed and, on lower end parts of the guide plates 71*a* and 71*b*, side edges of the cap unit 30 are supported. On the guide rails 70*a* and 70*b*, a carriage 72 is slidably supported and, on the carriage 72, the maintenance unit 19 is placed.

The cap unit 30 is reciprocally movable between a first position right below the recording portion 9 and a second position (the position in FIG. 6) horizontally (arrow-X direction) retracted from the first position. In the first position, the cap unit 30 can move upward (arrow-Z direction) to cap the recording heads 17*a* to 17*c*.

The maintenance unit 19 is reciprocally movable between a first position right below the recording portion 9 and a second position (the position in FIG. 6) horizontally (arrow-X direction) retracted from the first position. In the first position, the maintenance unit 19 can move upward (arrow-Z direction) to perform wiping operation, which will be described later.

Specifically, on the outer surface of the guide rail 70*b* are fitted, to permit the carriage 72 to move along arrow-XX' direction, a drive motor 73, a gear train (not shown) that meshes with the drive motor 73 and with rack teeth 72*a* on the carriage 72, and a cover member 75 that covers these. As the drive motor 73 rotates forward, the gear train rotates so that the carriage 72 and the maintenance unit 19 move from the second position to the first position.

In four corners of the carriage 72, there are provided support arms (not shown) that support the maintenance unit 19 from below and that are swingable (between an upright position and a collapsed position). On the outer surface of the carriage 72 are fitted, to permit the support arms to swing, a wipe lift motor 76 and a gear train (not shown) that meshes with the drive output gear of the wipe lift motor 76.

As the wipe lift motor 76 rotates forward, the gear train rotates so that the support arms swing (stand upright). This lifts up the maintenance unit 19. The wipe lift motor 76, the gear train, the support arms, and the like constitute a unit ascent/descent mechanism that moves the maintenance unit 19 along the up-down direction (arrow ZZ' direction). On the inner surface of the carriage 72, guide grooves (not shown) that extend along the up-down direction are formed, and the maintenance unit 19 ascends and descends along the guide grooves.

Figure 7:
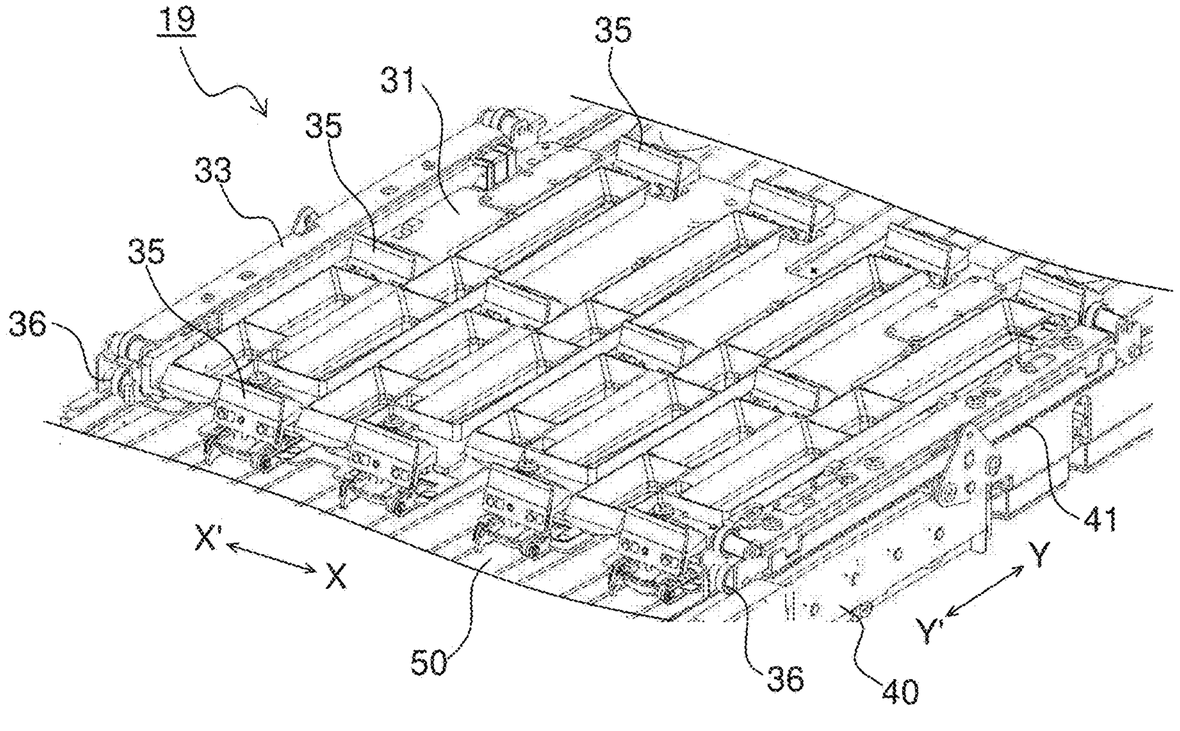
FIG. 7 is an enlarged part view of the maintenance unit mounted in the printer as seen from above.

FIG. 7 is an enlarged part view, as seen from above, of the maintenance unit 19 mounted in the printer 100. The maintenance unit 19 includes a blade unit 31 to which a plurality of wipers 35 are fixed, a wiper carriage 33 in a substantially rectangular shape to which the blade unit 31 is fitted, a support frame 40 that supports the wiper carriage 33, and an ink collection tray 50 disposed on the top face of the support frame 40.

As shown in FIG. 7, at opposite edges of the top face of the support frame 40, rail grooves 41 are formed. At four places on the wiper carriage 33, slide pulleys 36 provided, and these fit in the rail grooves 41 so that the wiper carriage 33 is supported so as to be slidable along arrow-YY' direction relative to the support frame 40.

To the support frame 40 are fitted, to permit the wiper carriage 33 to move in the horizontal direction (arrow-YY' direction), a wiper drive motor and a rack drive gear that meshes with a rack on the wiper carriage 33 (neither is shown). As the wiper drive motor rotates forward and backward, via the gear train, the rack drive gear rotates forward and backward so that the wiper carriage 33 reciprocally moves in the horizontal direction (arrow-YY' direction).

The wipers 35 are blade-form members made of rubber such as EPDM for wiping off the ink pushed out of the ink ejection ports 18 in the recording heads 17*a* to 17*c* and the cleaning liquid supplied from the cleaning liquid feed portion 60. The wipers 35 are pressed substantially vertically against a wipe start position outside the nozzle regions Ra to Rd (see FIG. 5) where the ink ejection ports 18 are exposed and, as the wiper carriage 33 moves, the wipers 35 wipe the ink ejection surface F1, including the nozzle regions Ra to Rd, in a predetermined direction (arrow-Y direction).

A total of 12 wipers 35 are disposed, four at substantially equal intervals along the width direction (arrow-XX' direction) of the blade unit 31 in each of three rows along the movement direction of the wiper carriage 33 (arrow-YY' direction). The wipers 35 are disposed, respectively, at positions corresponding to the recording heads 17*a* to 17*c* (see FIG. 3) in the line heads 11Y to 11K. The blade unit 31 is removably attached to the wiper carriage 33 and can be replaced when the wipers 35 wear or break.

On the top face of the support frame 40, an ink collection tray 50 is disposed for collecting the waste ink wiped off the ink ejection surface F1 with the wipers 35. The waste ink that has been wiped off the ink ejection surface F1 with the wipers 35 and has fallen onto the ink collection tray 50 is routed through an ink collection passage to be collected in a waste ink collection tank (neither is shown).

Figure 8:
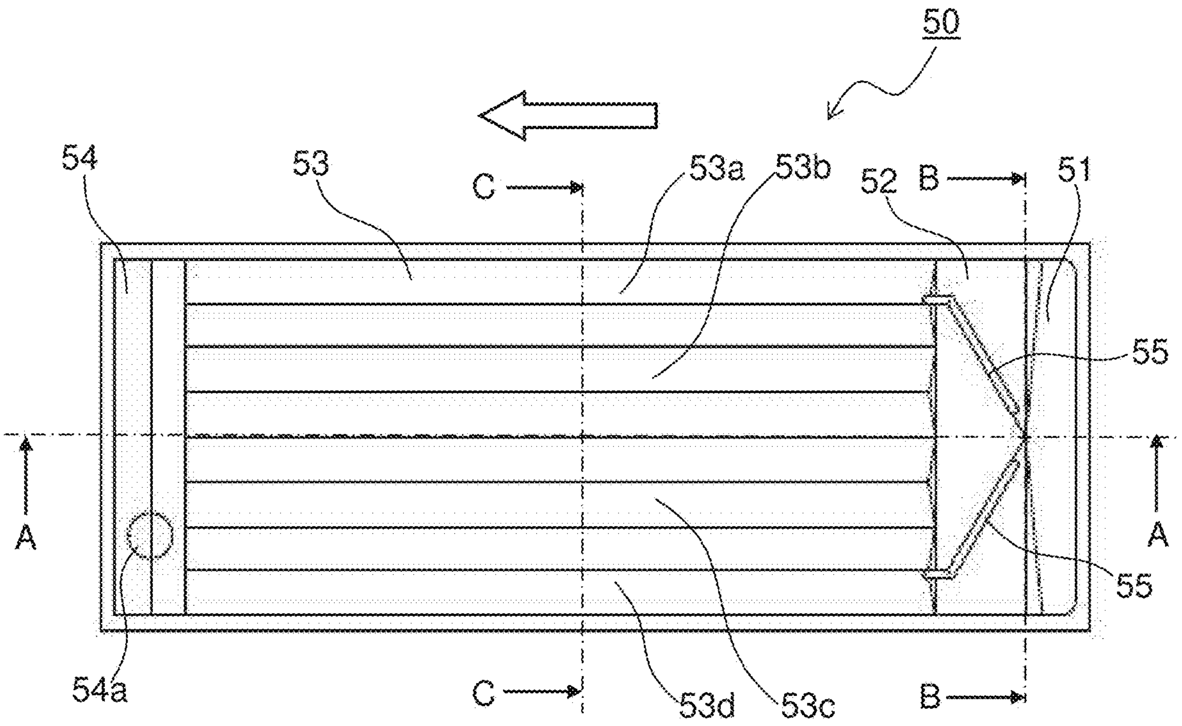
FIG. 8 is a plan view of an ink collection tray mounted in the maintenance unit.
Figure 9:
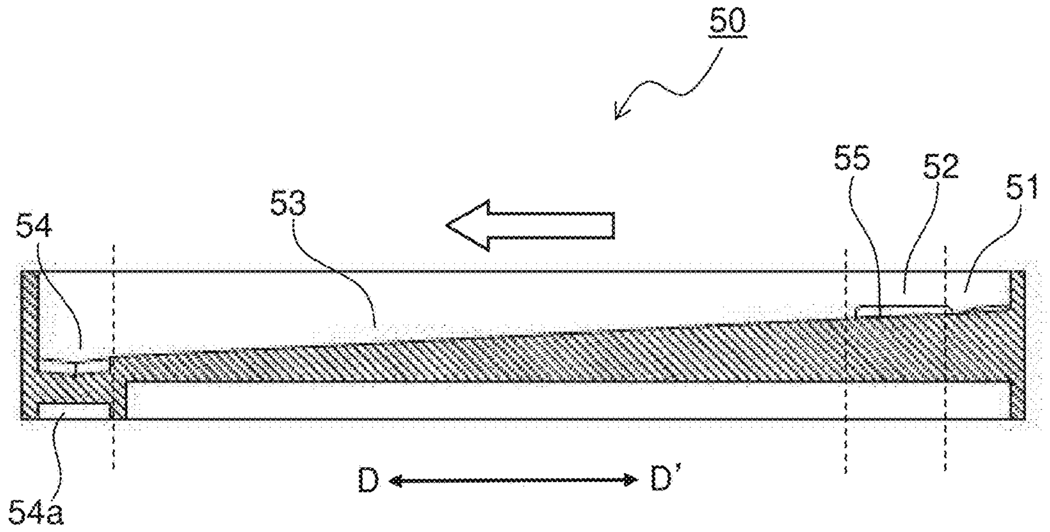
FIG. 9 is a sectional view of the ink collection tray as cut along its longitudinal direction.

3. Structure of the Ink Collection Tray: FIG. 8 is a plan view of the ink collection tray 50 mounted in the maintenance unit 19 of the embodiment. FIG. 9 is a sectional view of the ink collection tray 50 as cut along its longitudinal direction (i.e., a sectional view as seen from arrows AA in FIG. 8). The ink collection tray 50 has formed in it, along the longitudinal direction (arrow DD' direction in FIG. 9), a cleaning liquid catching portion 51, a waste ink catching portion 53, and a waste ink discharge portion 54.

As shown in FIG. 9, the top surface of the ink collection tray 50 has a downward slope from the cleaning liquid catching portion 51 toward the waste ink discharge portion 54. Thus, the waste ink that has fallen into the ink collection tray 50 flows from one side (where the cleaning liquid catching portion 51 is located) to the other side (where the waste ink discharge portion 54 is located) in the longitudinal direction. The direction of the flow of the waste ink is indicated by a hollow arrow.

Figure 10:
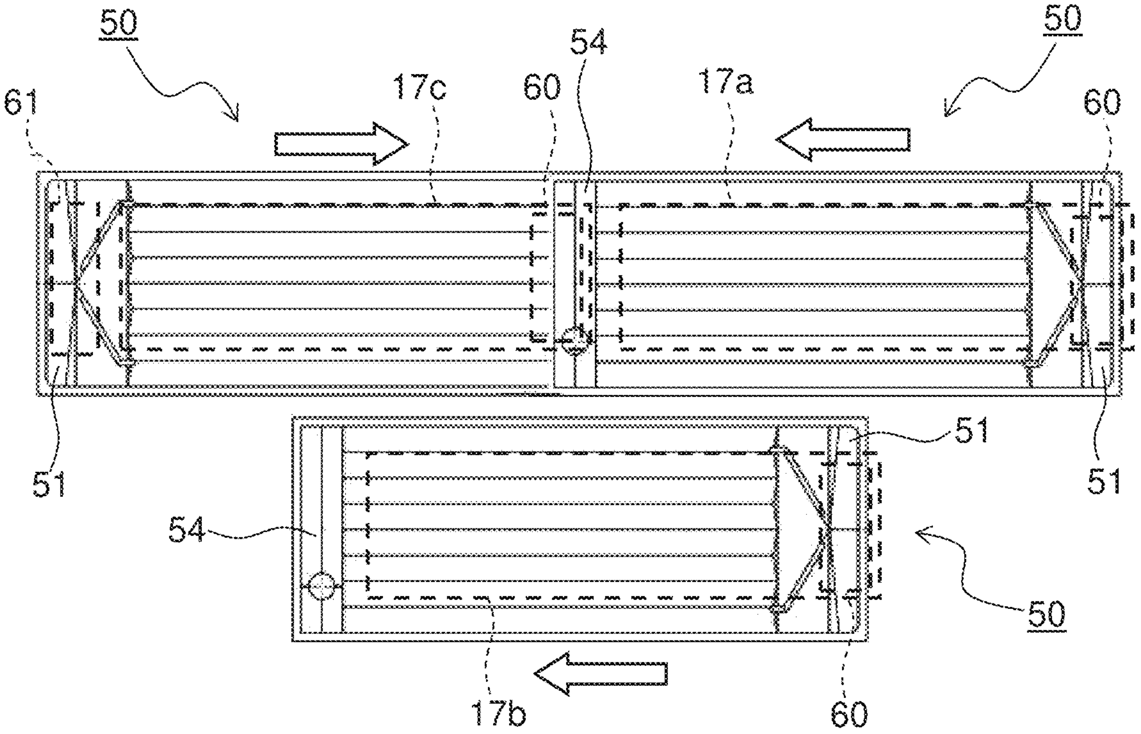
FIG. 10 is a plan view showing the positional relationship of the recording heads in the line head with the ink collection tray.

FIG. 10 is a plan view showing the positional relationship of the recording heads 17*a* to 17*c* in the line heads 11Y to 11K with the ink collection tray 50. As shown in FIG. 10, opposite the recording heads 17*a* and 17*b*, the ink collection tray 50 shown in FIG. 8 is disposed. On the other hand, opposite the recording head 17*c*, the ink collection tray 50 shown in FIG. 8 is disposed 180° turned around.

More specifically, the ink collection trays 50 opposite the recording heads 17*a* and 17*c* share a common waste ink discharge portion 54 formed at the boundary between them. In those ink collection trays 50, the waste ink flows in opposite directions toward the waste ink discharge portion 54 (in FIG. 10, inward along the left-right direction).

In the maintenance unit 19, one set of three ink collection trays 50 as shown in FIG. 10 is provided for each of the four line heads 11Y to 11K, so that a total of 12 ink collection trays 50 are disposed.

Figure 11:
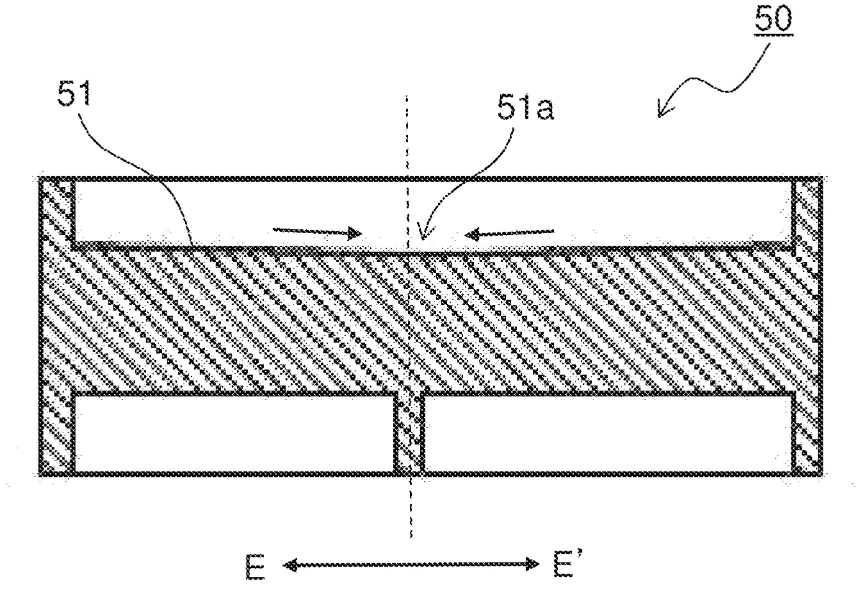
FIG. 11 is a sectional view of a cleaning liquid catching portion of the ink collection tray as cut along the tray width direction.

FIG. 11 is a sectional view of the cleaning liquid catching portion 51 of the ink collection tray 50 as cut along the tray width direction (i.e., a sectional view as seen from arrows BB in FIG. 8). The cleaning liquid catching portion 51 is a portion for catching the cleaning liquid supplied to the ink collection tray 50. As shown in FIG. 11, the cleaning liquid catching portion 51 has a V-shaped cross section that has a downward slope from opposite end parts of it along the direction orthogonal to the longitudinal direction of the ink collection tray 50 (i.e., the tray width direction, that is arrow EE' direction in FIG. 11) toward a middle part (lowest part) 51*a* of it.

As shown in FIG. 10, in the ink collection trays 50 opposite the recording heads 17*a* and 17*b*, the cleaning liquid catching portions 51 face the cleaning liquid feed portions 60 of the recording heads 17*a* and 17*b*. This permits the cleaning liquid to drop from the cleaning liquid feed portions 60 to the cleaning liquid catching portions 51.

On the other hand, in the ink collection tray 50 opposite the recording head 17*c*, the cleaning liquid catching portion 51 is located opposite from the cleaning liquid feed portion 60. Thus a cleaning liquid feeding mechanism 61 for dropping the cleaning liquid to the cleaning liquid catching portion 51 is provided separately from the cleaning liquid feed portion 60 for the recording head 17*c*.

As shown in FIGS. 8 and 9, the cleaning liquid spreading portion 52 is formed between the cleaning liquid catching portion 51 and the waste ink catching portion 53. In the cleaning liquid spreading portion 52, a pair of ribs 55 are formed that spread in a fan shape from the cleaning liquid catching portion 51 toward the waste ink catching portion 53. The upstream ends 55*a* (ends pointing to the cleaning liquid catching portion 51) of the ribs 55 extend to a middle part 51*a* of the cleaning liquid catching portion 51. The downstream ends 55*a* (ends pointing to the waste ink catching portion 53) of the ribs 55 extend up to grooves 53*a* and 53*d* in the waste ink catching portion 53.

Figure 12:
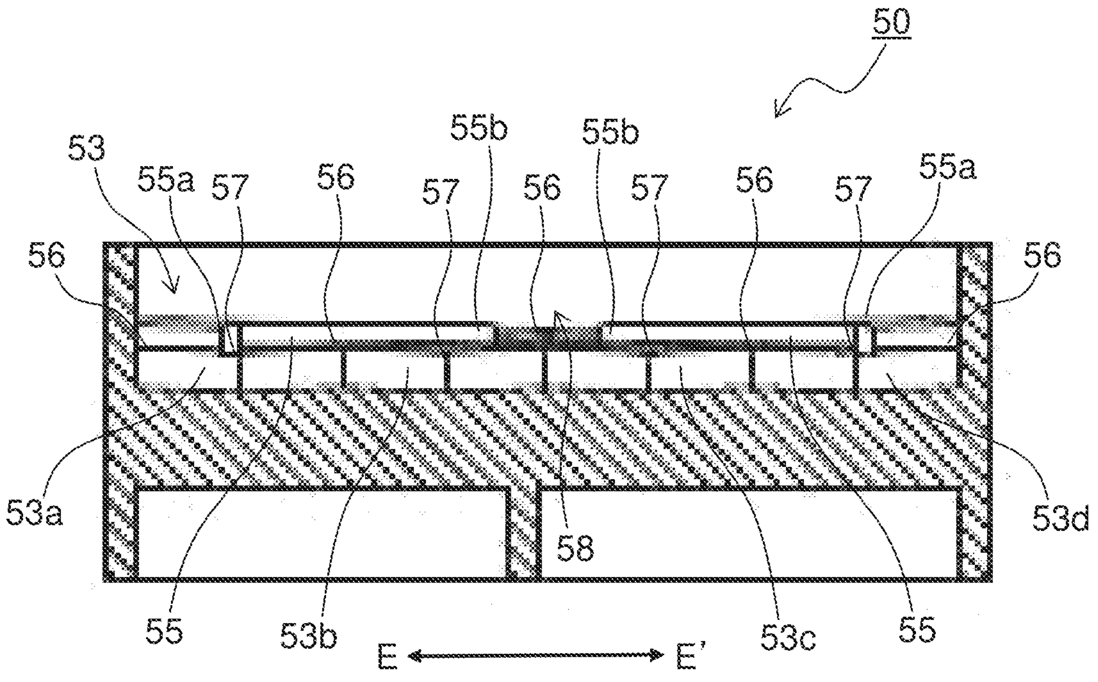
FIG. 12 is a sectional view of a waste ink catching portion of the ink collection tray as cut along the tray width direction.

FIG. 12 is a sectional view of the waste ink catching portion 53 of the ink collection tray 50 as cut along the tray width direction (i.e., a sectional view as seen from arrows CC in FIG. 8). The waste ink catching portion 53 is formed downstream of the cleaning liquid spreading portion 52, adjacent to it, and faces the ink ejection surface F1 of the recording heads 17*a* to 17*c*. In the waste ink catching portion 53, four grooves 53*a* to 53*d* are formed that extend along the downward slope of the ink collection tray 50 (in the direction perpendicular to the plane of FIG. 12, that is, arrow DD' direction in FIG. 9).

The grooves 53*a* to 53*d* are formed adjacent to each other, parallel to each other, with ridge portions 56 and valley portions 57 alternating along the tray width direction (arrow EE' direction). The grooves 53*a* to 53*d* have a V-shaped cross section.

The waste ink discharge portion 54 is formed downstream of the waste ink catching portion 53, adjacent to it. In one end part of the waste ink discharge portion 54, an ink discharge port 54*a* is provided. The waste ink discharge portion 54 has a downward slope toward the ink discharge port 54*a*. That is, the ink discharge port 54*a* is provided in the lowest part of the waste ink discharge portion 54.

Next, a description will be given of the flow of the cleaning liquid and the waste ink as observed when the cleaning liquid is dropped on the ink collection tray 50. The cleaning liquid dropped from the cleaning liquid feed portion 60 (or the cleaning liquid feeding mechanism 61) on the cleaning liquid catching portion 51 flows along the V-shape (see FIG. 11) of the cleaning liquid catching portion 51 and collects in a middle part 51*a* of it in the tray width direction. The cleaning liquid that has collected in the middle part 51*a* in the tray width direction moves along the slope of the ink collection tray 50 to the cleaning liquid spreading portion 52.

The cleaning liquid that has moved to the cleaning liquid spreading portion 52 reaches the ribs 55. Part of the cleaning liquid flows along the ribs 55 while spreading outward along the tray width direction. The downstream ends 55*b* of the ribs 55 (ends pointing to the waste ink catching portion 53) extend up to the grooves 53*a* and 53*d*, and this ensures that the cleaning liquid flows, along the ribs 55, into the outer grooves 53*a* and 53*d* along the tray width direction.

The dimension of protrusion of the ribs 55 is not so large as to contain the flow of the cleaning liquid (specifically, about 1 to 3 mm). Thus part of the cleaning liquid flows over the ribs 55. Moreover, between the upstream ends 55*a* (ends pointing to the cleaning liquid catching portion 51) of the two ribs 55, a gap 58 is formed. This ensures that part of the cleaning liquid passes through the gap 58 and flows into the inner grooves 53*b* and 53*c* along the tray width direction.

With the structure according to the embodiment, the ink collection tray 50 is provided with a cleaning liquid catching portion 51 with a V-shaped cross section along the tray width direction. This permits the cleaning liquid to collect in the middle part 51*a* along the tray width direction despite the cleaning liquid dropping at varying positions.

Owing to the cleaning liquid spreading portion 52 having the pair of ribs 55 formed on it so as to spread in a fan shape from the cleaning liquid catching portion 51 toward the waste ink catching portion 53, the cleaning liquid collected in the middle part 51*a* along the tray width direction can be reliably spread outward along the tray width direction while being led to the waste ink catching portion 53.

Owing to the waste ink catching portion 53 having the grooves 53*a* to 53*d*, the cleaning liquid that has flowed into the waste ink catching portion 53 passes along the grooves 53*a* to 53*d* to reach the waste ink discharge portion 54. Thus, as compared with, for example, a waste ink catching portion 53 with the shape of a single V that has a downward slope toward a middle part along the tray width direction, the cleaning liquid more easily flows over the entire region of the waste ink catching portion 53.

Owing to the valley portions 57 and the ridge portions 56 being disposed alternately, the grooves 53*a* to 53*d* with a V-shape cross section are formed continuously. This permits the cleaning liquid to move between the grooves 53*a* to 53*d* easily over the ridge portions 56. Thus a small amount of cleaning liquid suffices to efficiently clean the entire region of the waste ink catching portion 53.

While in the embodiment four grooves 53*a* to 53*d* are formed, there is no particular limitation on the number of grooves, which can be two or three, or five or more. Too few grooves, however, result in, even with the same inclination angle between the ridge portions and the valley portions of the grooves (the same inclination angle of the V-shape), a larger depth of the grooves. This makes it difficult for the cleaning liquid to make contact with the waste ink deposited on outer parts of the grooves along the tray width direction and necessitates flushing with a large amount of cleaning liquid. It also results in a larger dimension of the ink collection tray 50 along the top-bottom direction.

On the other hand, too many grooves result in, with the same inclination angle between the ridge portions and the valley portions of the grooves, a small depth of the grooves. This makes the waste ink catching portion 53 flatter and makes it difficult to control the flow of the waste ink and the cleaning liquid. Thus, a preferred number of grooves is three to five and it is particularly preferable to form four grooves 53*a* to 53*d* as in the embodiment. The preferred inclination angle between the ridge portions 56 and the valley portions 57 of the grooves 53*a* to 53*d* is about 3 to 5 degrees.

The grooves 53*b* and 53*c* closest to the middle part 51*a* of the cleaning liquid catching portion 51 can be made shallower than the groove 53*a* and 53*d* (can be given a larger V-shape angle than the groove 53*a* and 53*d*). Thus, owing to the grooves 53*b* and 53*c*, which are the first to be reached by the cleaning liquid, being shallower, the cleaning liquid easily flows from the grooves 53*b* and 53*c* over the ridge portions 56 to the grooves 53*a* and 53*d* at opposite sides. The grooves 53*b* and 53*c* do not need to be made shallower over their entire region than the grooves 53*a* and 53*d*; at least upstream parts (parts pointing to the cleaning liquid catching portion 51) of the former have to be shallower than the latter.

The present disclosure can be implemented in any manner other than as in the embodiment described above, and allows for any modifications without departure from the spirit of the present disclosure. For example, there is no particular limitation on the number of ink collection trays 50 and their arrangement direction, which can be determined as desired according to the number of recording heads disposed in each of the line heads 11Y to 11K.

The present disclosure finds applications in inkjet recording apparatuses provided with an ink collection tray that catches ink pushed out through an ink ejection surface of a recording head. On the basis of the present disclosure it is possible to provide an inkjet recording apparatus that can, with cleaning liquid, efficiently flush off ink that has fallen into an ink collection tray.

What is claimed is:

1. An inkjet recording apparatus comprising an ink collection tray that, when recovery operation is performed for a recording head that ejects ink onto a recording medium, is disposed opposite the recording head to collect the ink pushed out onto an ink ejection surface of the recording head;

a cleaning liquid feeding mechanism that feeds onto the ink collection tray a cleaning liquid for flushing off the ink, wherein the ink collection tray includes:

a cleaning liquid catching portion that catches the cleaning liquid dropped from the cleaning liquid feeding mechanism;

a waste ink catching portion disposed opposite the ink ejection surface;

a cleaning liquid spreading portion disposed between the cleaning liquid catching portion and the waste ink catching portion; and a waste ink discharge portion disposed adjacent to the waste ink catching portion opposite from the cleaning liquid spreading portion, the ink collection tray having a downward slope from the cleaning liquid catching portion toward the waste ink discharge portion, the waste ink catching portion has formed therein a plurality of grooves with a V-shaped cross section extending along the downward slope, and the cleaning liquid spreading portion has formed thereon a pair of ribs spreading in a fan shape from the cleaning liquid catching portion toward the waste ink catching portion.

2. The inkjet recording apparatus according to claim 1, wherein the cleaning liquid catching portion has a V-shaped cross section with a downward slope from opposite end parts to a middle part thereof along a tray width direction orthogonal to the downward slope of the ink collection tray, and end parts of the pair of ribs pointing to the cleaning liquid catching portion extend up to the middle part of the cleaning liquid catching portion.

3. The inkjet recording apparatus according to claim 2, wherein between the end parts of the pair of ribs pointing to the cleaning liquid catching portion, a gap is formed.

4. The inkjet recording apparatus according to claim 1, wherein end parts of the pair of ribs pointing to the waste ink catching portion extend up to, of the plurality of grooves, outermost grooves in a tray width direction orthogonal to the downward slope of the ink collection tray.

5. The inkjet recording apparatus according to claim 1, wherein of the plurality of grooves, grooves closest to a middle in a tray width direction orthogonal to the downward slope from the cleaning liquid catching portion are, at least in parts thereof pointing to the cleaning liquid catching portion, shallower than the other grooves.

6. The inkjet recording apparatus according to claim 1, wherein the plurality of grooves are formed adjacent to each other, parallel to each other, with ridge portions and valley portions alternating along a tray width direction orthogonal to the downward slope of the ink collection tray, with an inclination angle of 3 to 5 degrees between the ridge portions and the valley portions.

7. The inkjet recording apparatus according to claim 1, wherein the recording head has a cleaning liquid feeding portion that feeds the cleaning liquid to the ink ejection surface, and the cleaning liquid feeding portion doubles as the cleaning liquid feeding mechanism, with the cleaning liquid catching portion disposed opposite the cleaning liquid feeding portion.

8. The inkjet recording apparatus according to claim 1, further comprising:

a maintenance unit that has a wiper movable across the ink ejection surface and that performs the recovery operation for the recording head by wiping off with the wiper the ink pushed out onto the ink ejection surface, and the ink collection tray is mounted in the maintenance unit.

* * * * *